United States Patent [19]
Heiberger

[11] Patent Number: 5,494,198
[45] Date of Patent: Feb. 27, 1996

[54] INSULATED CONTAINER

[76] Inventor: Robert A. Heiberger, 2325 13th St., Boulder, Colo. 80304

[21] Appl. No.: 251,749

[22] Filed: May 31, 1994

Related U.S. Application Data

[63] Continuation-in-part of Ser. No. 645,569, Jan. 24, 1991, Pat. No. 5,316,193.

[51] Int. Cl.$^6$ .............................. B67D 5/00; B67D 37/00
[52] U.S. Cl. ......................... 222/183; 222/212; 222/215; 220/450; 220/469
[58] Field of Search .................................... 222/131, 183, 222/215, 212, 206; 220/450, 465, 469

[56] References Cited

U.S. PATENT DOCUMENTS

| | | |
|---|---|---|
| 1,475,439 | 11/1919 | Lamassiaude . |
| 1,673,446 | 6/1927 | Eveleth . |
| 2,024,065 | 12/1935 | Schellens . |
| 2,051,440 | 8/1936 | Eicker ..................................... 222/183 |
| 2,338,604 | 1/1944 | Silveyra . |
| 2,643,021 | 5/1950 | Freedman . |
| 2,805,561 | 4/1954 | Emmert et al. . |
| 2,987,212 | 6/1961 | Scanlon . |
| 3,039,648 | 6/1962 | Busch . |
| 3,119,543 | 1/1964 | Walker . |
| 3,149,742 | 3/1963 | Hay et al. . |
| 3,152,729 | 10/1964 | Piker . |
| 3,164,148 | 1/1965 | Tolciss . |
| 3,450,254 | 6/1969 | Miles . |
| 3,484,011 | 12/1969 | Greenhalgh et al. . |
| 4,055,268 | 10/1977 | Barthel . |
| 4,196,721 | 4/1980 | Posnansky . |
| 4,330,066 | 5/1982 | Berliner . |
| 4,531,655 | 7/1985 | Putman . |
| 4,635,814 | 1/1987 | Jones . |
| 4,997,661 | 3/1991 | Kromer . |
| 5,121,856 | 6/1992 | Weiler et al. ........................... 222/215 |

FOREIGN PATENT DOCUMENTS 0276198  7/1988  European Pat. Off. ............... 222/215

*Primary Examiner*—H. Grant Skaggs
*Attorney, Agent, or Firm*—Timothy J. Martin

[57] ABSTRACT

The present invention is directed to an insulated container that is used to inhibit heat transfer between liquid contained in the interior of the insulated container and the exterior ambient environment. The container has an inner body and an outer shell. The outer shell has an opening which receives the inner container body in a close fitted, telescopic engagement. Respective concavities on the inner body and the outer shell engage one another to help lock the inner body and the outer shell together. The insulated container includes a cap structure that is removably connected to the inner body and retains the liquid in the interior of the insulated container. Protrusions on the inner body are used to maintain a spaced-apart relationship between the sidewalls when the inner container body. The cap structure may include a valve assembly from which to dispense the liquid.

25 Claims, 5 Drawing Sheets

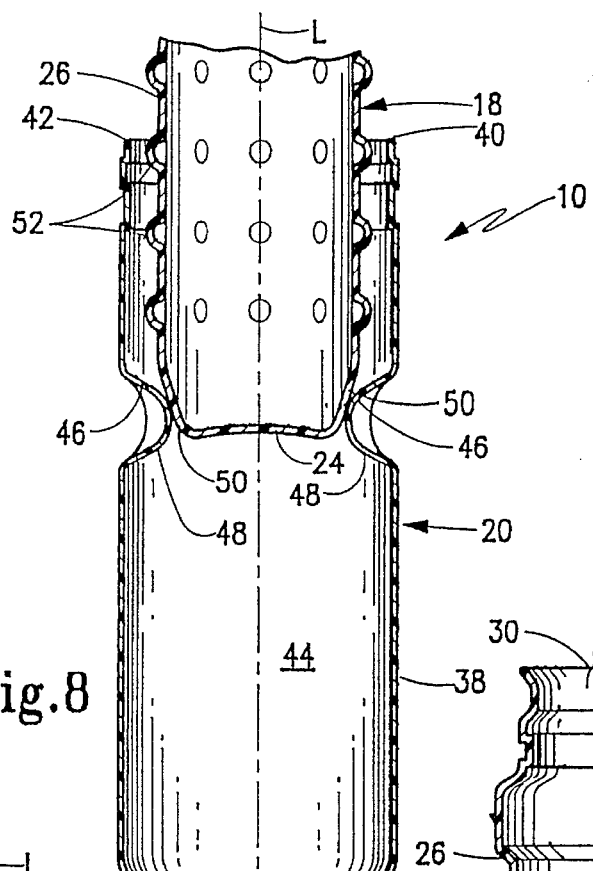
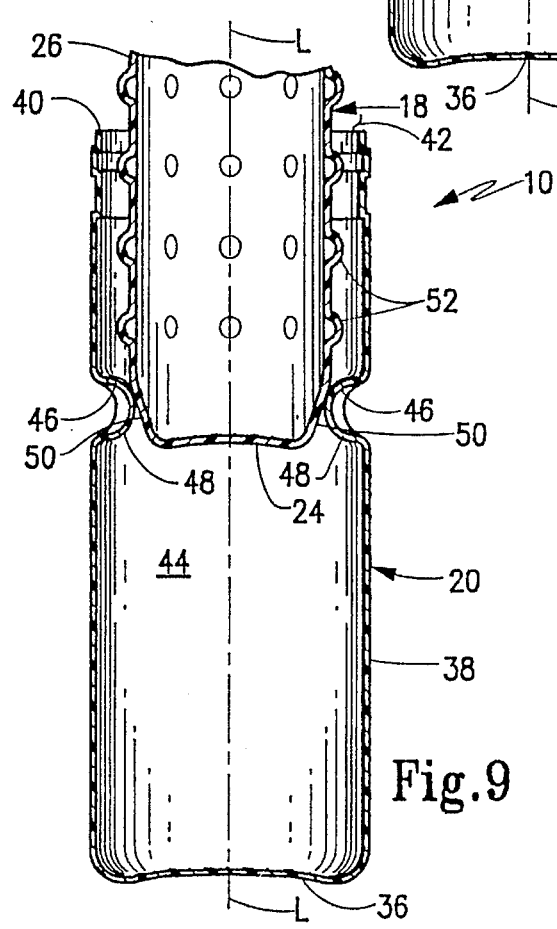
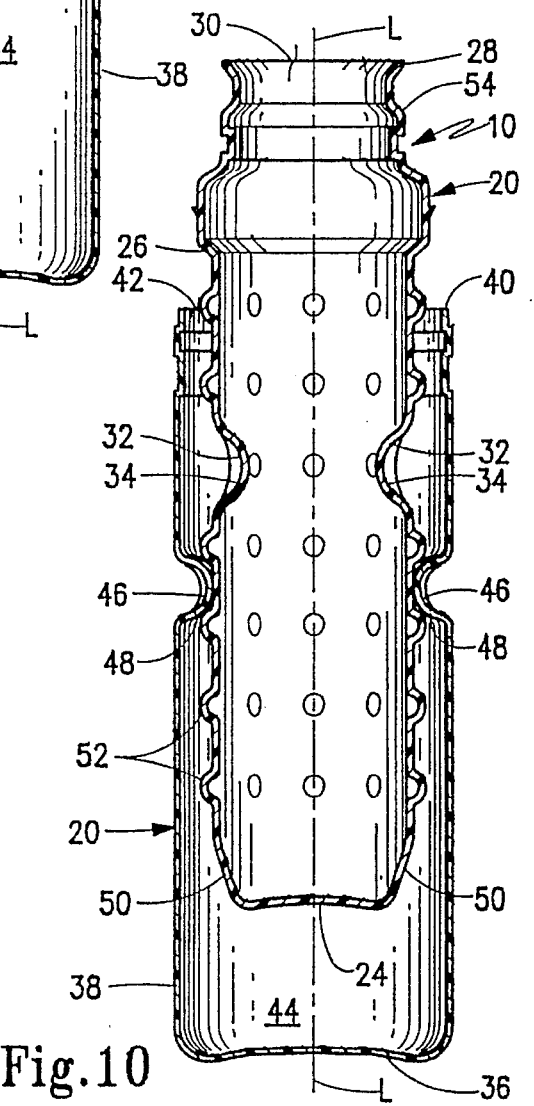
Fig. 8
Fig. 9
Fig. 10

INSULATED CONTAINER

This is a continuation-in-part of my patent application bearing Ser. No. 07/645,569 filed on Jan. 24, 1991, and entitled BOTTLE WITH REFLECTIVE BARRIER LAYER FOR REDUCING ELECTROMAGNETIC ENERGY TRANSFER, now U.S. Pat. No. 5,316,193.

FIELD OF INVENTION

The present invention generally relates to an insulated container and, more particularly, it is directed to an insulated container which is used to inhibit heat transfer between a liquid contained in an interior of the insulated container and an exterior ambient environment. The present invention is specifically suitable for carrying by physical fitness enthusiasts such as joggers, hikers and bicyclists to provide a cool, refreshing drink when desired.

BACKGROUND OF THE INVENTION

It is well known that animals and plants alike must maintain certain fluid levels or risk danger of dehydration. For animals including human beings, dehydration results in depriving bodily organs of vitality. Severe dehydration can result in damage to bodily organs or even death. When bodily fluid levels become low, the brain instinctively triggers a sensation of thirst. Drinking liquids such as water quenches thirst and, therefore, a body instinctively avoids becoming dehydrated. Today, numerous physical activities of human beings such as manual labor, jogging, hiking and bicycling causes the body to perspire, thus draining the body of bodily fluids. Again, the brain triggers a sensation of thirst to signal the need to replenish exhausted bodily fluids. Often, those engaged in physical activities have immediate access to sources of water or other liquids. These sources of water can be either fixed sources, such as water taps or water fountains, or portable sources of water such as a canteen or water bottle.

Today, a popular source of portable water is a plastic water bottle. Typically, these plastic water bottles are of single-wall construction and have a stem valve assembly mounted to a cap structure. Upon opening the stem valve, water can be squeezed from the plastic bottle and into a person's mouth for drinking. Unfortunately, those engaged in physical activities are usually outdoors during sunny daytime hours. Warm outdoor temperatures and direct sunlight tend to warm the water inside the plastic water bottle. Although warm water is adequate to quench a body's need for fluid, warm water is often unsavory to the drinker.

Insulated containers are well known in the art. One example of an insulated container is shown in U.S. Pat. No. 2,643,021 issued on Jun. 23, 1953 to Friedman and another example is shown in U.S. Pat. No. 3,164,148 issued Jan. 5, 1965 to Tolciss. Although both of these insulated containers would be effective in thermally insulating a liquid contained therein, such containers are not conducive for carrying by physical fitness enthusiasts.

An insulated container which is conducive for carrying by physical fitness enthusiasts and manual laborers is shown in my patent application, Ser. No. 07/645,569 filed Jan. 24, 1991 and entitled BOTTLE WITH REFLECTIVE BARRIER LAYER FOR REDUCING ELECTROMAGNETIC ENERGY TRANSFER, now U.S. Pat. No. 5,316,193. Generally, this insulated container, which is fabricated from a stiff yet resilient material, includes an inner container body having a continuous channel extending circumferentially about an inner cylindrical wall and an outer shell having a continuous rib projecting from and extending circumferentially around an outer cylindrical wall. The outer shell is sized and adapted to slidably receive the inner container body so that when the inner container body is disposed within the outer shell, the continuous channel of the inner container body matably engages with the continuous rib. This matable engagement retains the inner cylindrical wall and the outer cylindrical wall in a close-fitted yet spaced-apart relationship from each other to form void space therebetween. Also, the insulated container includes an insulating layer of metallic foil material which is disposed between the inner container body and the outer shell to shield against radiant energy of sunlight.

Although this insulated container is lightweight and effectively insulates liquids contained therein, there is a problem associated with its assembly. The circumferential rib projecting from the outer cylindrical wall constricts the interior of the outer shell. By design, the diameter of the inner container body is larger than the diameter of the constricted portion in the interior of the outer shell. It is, therefore, difficult to insert the inner container body into the outer shell at least until the continuous channel of the inner container body matably engages with the continuous rib of the outer shell. Furthermore, when the inner container body is enveloped with an insulating layer of metallic foil and is then inserted into the outer shell, occasionally, the insulating layer tears where the rib compresses the insulating layer onto the inner container body.

A need exists to provide an insulated water bottle to maintain a cool liquid temperature so that the user can drink a refreshing amount of liquid when desired. There is also a need to provide an insulated container which is lightweight and simple to manufacture and assemble. The present invention satisfies these needs.

SUMMARY OF INVENTION

It is an object of the present invention to provide a new and useful insulated container which inhibits heat transfer between a liquid contained in the interior of the insulated container and an exterior ambient environment.

It is a further object of the present invention to provide an insulated container which is simple to manufacture and easy to assemble.

It is a further object of the present invention to provide an insulated container having an inner container body and an outer shell retained in a close-fitted yet spaced-apart relationship to each other to define void space therebetween.

It is yet a further object of the present invention to provide an insulated container whereby an additional insulating layer of material can be disposed between the inner container body and the outer shell to minimize heat transfer through radiant energy.

A still further object of the present invention is to provide an insulated container whereby surface to surface contact between the inner container body and the outer shell is minimal so as to minimize heat transfer by thermal conductivity.

Accordingly, an insulated container which is operative to inhibit heat transfer between the liquid stored in an interior thereof and an exterior ambient environment is hereinafter described. In its broadest form, the insulated container includes an inner container body, an outer shell and a cap structure. The inner container body is formed of a stiff yet resilient material such as plastic. The inner container body includes a first bottom wall connected to a surrounding first sidewall extending longitudinally and terminating in a first top rim defining a first opening into the interior of the insulated container. The first sidewall has a pair of opposed elongated first concavities oriented transversely to a longitudinal axis of the inner container body which forms a pair of exteriorly opening channels disposed opposite one another on the first sidewall of the inner container body.

The outer shell is fabricated of a stiff yet resilient material such as plastic. The outer shell includes a second bottom wall connected to a surrounding second sidewall extending longitudinally and terminating in a second top rim. The second top rim defines a second opening into a shell interior which is sized and adapted to receive the inner container body is a close-fitted yet spaced-apart telescopic engagement to define a mated state. The second sidewall has a pair of opposed elongated second concavities oriented transversely of the longitudinal axis when in the mated state thereby forming a pair of opposed interiorly projecting ribs sized and positioned to respectively engage the channels on the inner container body when in the mated state.

The cap structure is removably connected to the inner container body and is operative in a cap-on condition to cover and retain the liquid in the interior of the insulated container. In a cap-off condition, the cap structure permits the liquid to be transferred into and be dispensed from the interior of the insulated container.

The inner container body includes a pair of opposed flat walls which are connected to the first sidewall and the first bottom wall to form a tapered body portion of the inner container body. When the inner container body and the outer shell are moved into the mated state, the flat walls are operative to attack the ribs thereby causing the ribs to separate so that the inner container body can be telescopically received into the outer shell. The inner container body also includes a plurality of protrusions extending longitudinally along and circumferentially about the first sidewall. The plurality of protrusions are operative to maintain a spaced-apart relationship between the first sidewall and the second sidewall when the inner container body and the outer shell are in the mated state. The inner container body also includes a neck which extends between the first top rim of the inner container body and the second top rim of the outer shell when the inner container body and the outer shell are in the mated state. The neck is operative to releasably receive the cap structure.

The insulated container includes an interlocking structure which has a ledge connected to either the inner container body or the outer shell and a groove formed into the other one of the inner container body and the outer shell. The groove is sized and adapted to receive the ledge in releasable and matable engagement so that the inner container body and the outer shell are interlocked when in the mated state. It is preferred that the ledge extends circumferentially about and radially outward from the first sidewall of the inner container body between the first top rim and the pair of first concavities. Correspondingly, it is preferred that the groove is formed circumferentially into the outer shell between the pair of second concavities and the second top rim and faces into the shell interior.

The insulated container preferably includes a retainer band which is sized and adapted to extend circumferentially about the outer shell between the pair of second concavities and the second top rim. The retainer band is operative to be removably force-fitted onto the outer shell. The retainer band includes a retainer channel extending circumferentially thereabout and facing radially inwardly. The outer shell includes a ridge extending radially outwardly and circumferentially thereabout. The ridge is disposed between the pair of second concavities and the second top rim. The retainer channel is sized and adapted to receive the ridge so that the retainer band and the outer shell can be releasably and matably engaged to each other. A retainer structure is connected to and between the retainer band and the cap structure. It is preferred that the retainer structure is a plastic strap which is formed as a unitary construction with the retainer band and the cap structure.

It is preferable that the cap structure include a valve assembly operative in an opened position and a closed position when the cap structure is in the cap-on condition. In the opened position, the valve assembly permits the liquids contained in the interior of the insulated container to be dispensed therefrom. In the closed position, the valve assembly prevents the liquid contained in the interior of the insulated container from being dispensed. To provide additional insulating capability, it is also preferred that the insulated container include an insulating element. It is further preferred that the insulating element is fabricated from a flexible insulating material which is sized and adapted to be disposed between the inner container body and the outer shell when the inner container body and the outer shell are in the mated state. The insulating element is fabricated from a metallic foil material and is formed as a pouch which is sized and adapted to slidably receive the inner container body so that, when the inner container body and the outer shell are in the mated state, the insulating element is disposed therebetween.

These and other objects of the present invention will become more readily appreciated and understood from a consideration of the following detailed description of the exemplary embodiments of the present invention when taken together with the accompanying drawings, in which:

BRIEF DESCRIPTION OF DRAWINGS

FIG. 8 is a cross-sectional view of an outer shell receiving a tapered bottom portion of the inner container body of the insulated container of the present invention;

FIG. 9 is a side view in elevation showing an oppositely-disposed pair of ribs being attacked by respective ones of oppositely-disposed flat walls forming the tapered bottom portion of inner container body of the insulated container of the present invention;

FIG. 10 is a cross-sectional view showing the outer shell receiving the inner container body after the tapered bottom portion of the inner container body passes the pair of ribs of the outer shell;

DETAILED DESCRIPTION OF THE EXEMPLARY EMBODIMENTS

An insulated container of the present invention is adapted to store a liquid and is operative to inhibit heat transfer between the liquid stored in an interior of the insulated container and an exterior ambient environment. One of ordinary skill in the art would appreciate that the insulated container of the present invention is operative to inhibit heat transfer between a cold liquid and a warm exterior ambient environment or a warm liquid and a cool exterior ambient environment. Additionally, the insulated container of the present invention includes an inner container body and an outer shell which receives the inner container body in a close-fitted yet spaced-apart telescopic engagement. Void space is created between the outer shell and the inner container body thereby minimizing heat transfer by conduction and convection. Also, an intermediate layer of a metallic foil material can be positioned in the void space between the inner container body and the outer shell to inhibit heat transfer by radiant energy.

Figure 1:
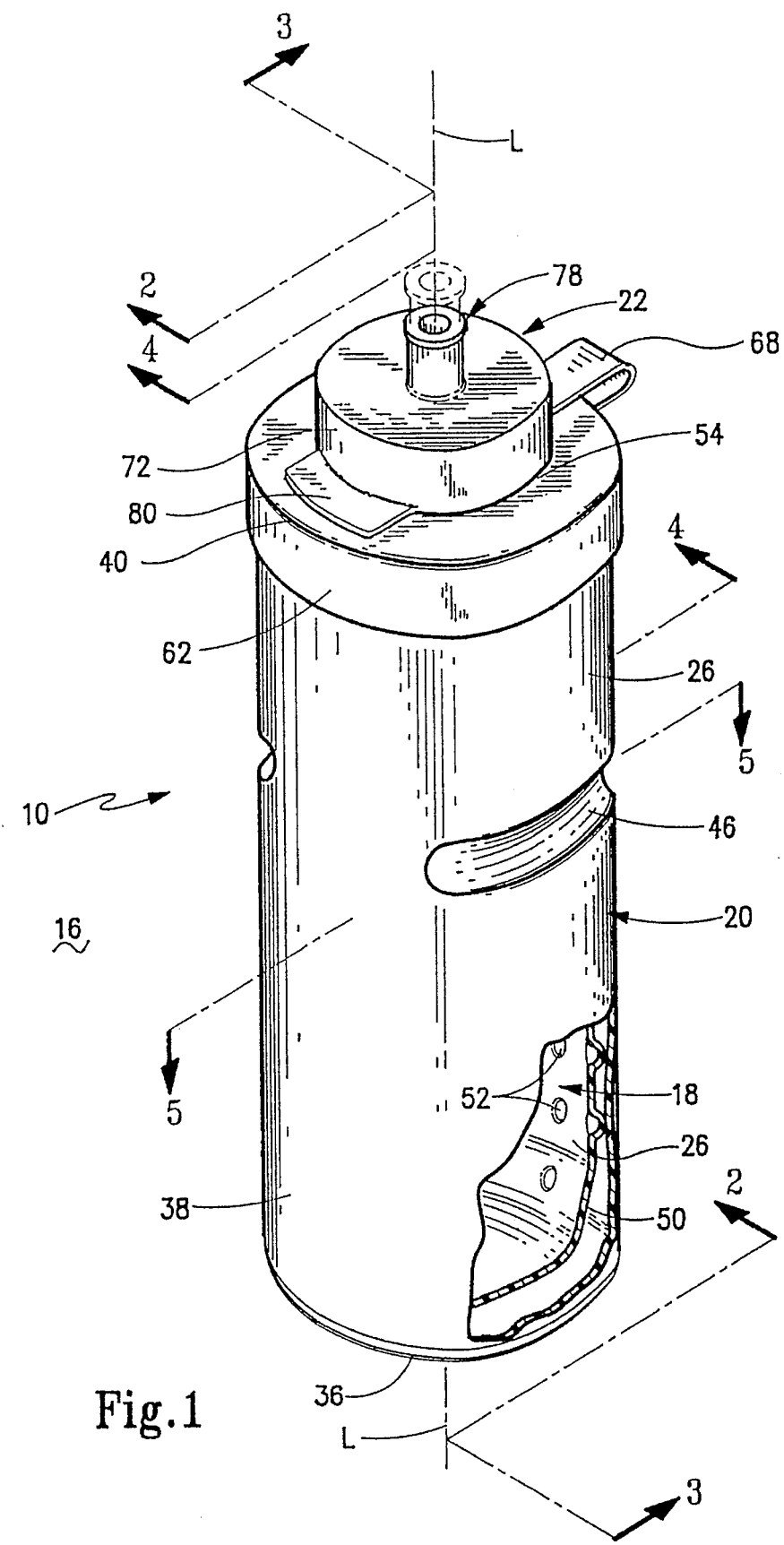
FIG. 1 is a perspective view of a first exemplary embodiment of an insulated container of the present invention having a cap structure disposed in a cap-on condition.
Figures 2, 3:
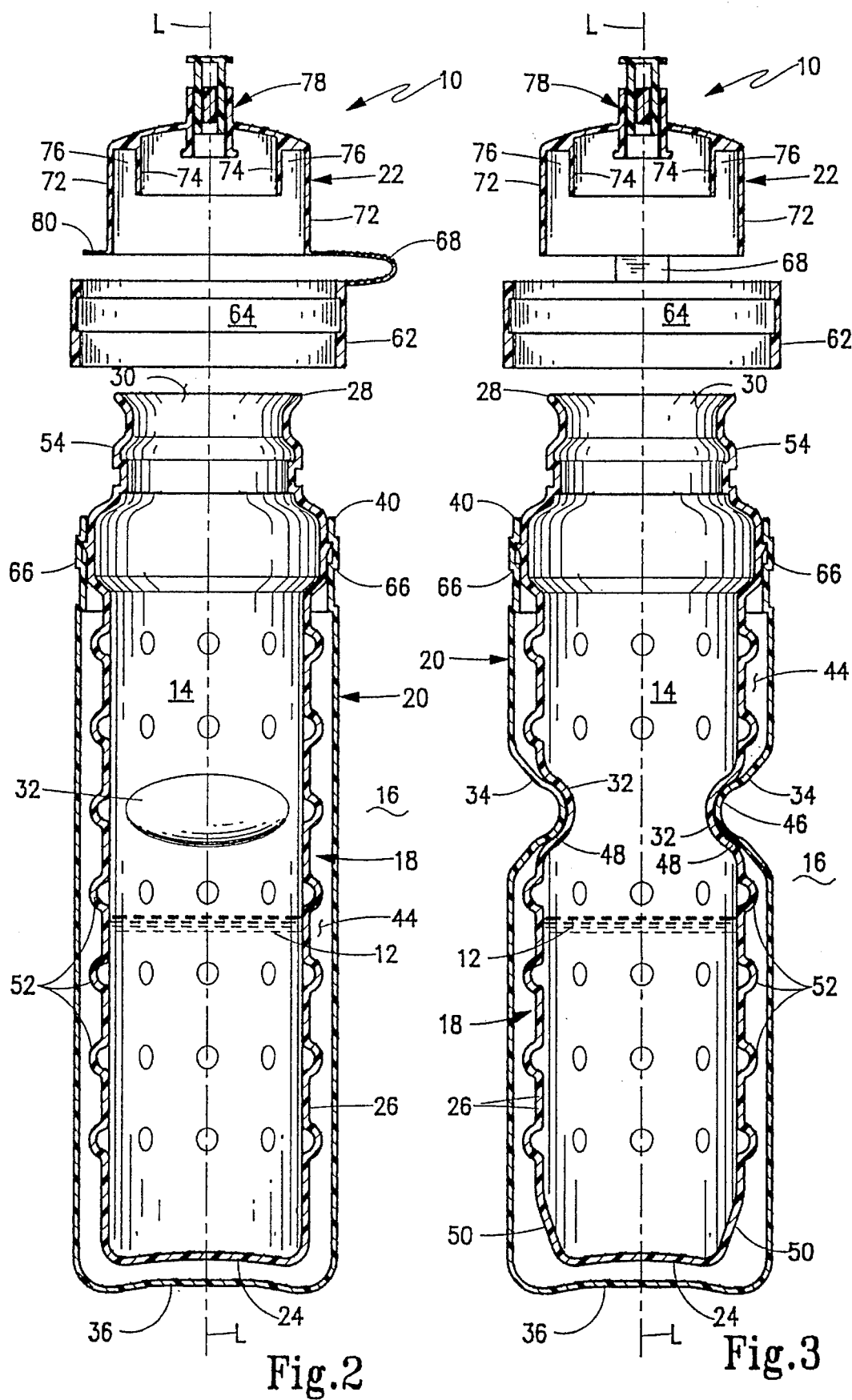
FIG. 2 is a side view in cross-section taken along lines 2—2 of FIG. 1 of the insulated container of the present invention with the cap structure in a cap-off condition.
FIG. 3 is a side view in cross-section taken along lines 3—3 of FIG. 1 of the insulated container of the present invention with the cap structure in the cap-off condition.
Figure 4:
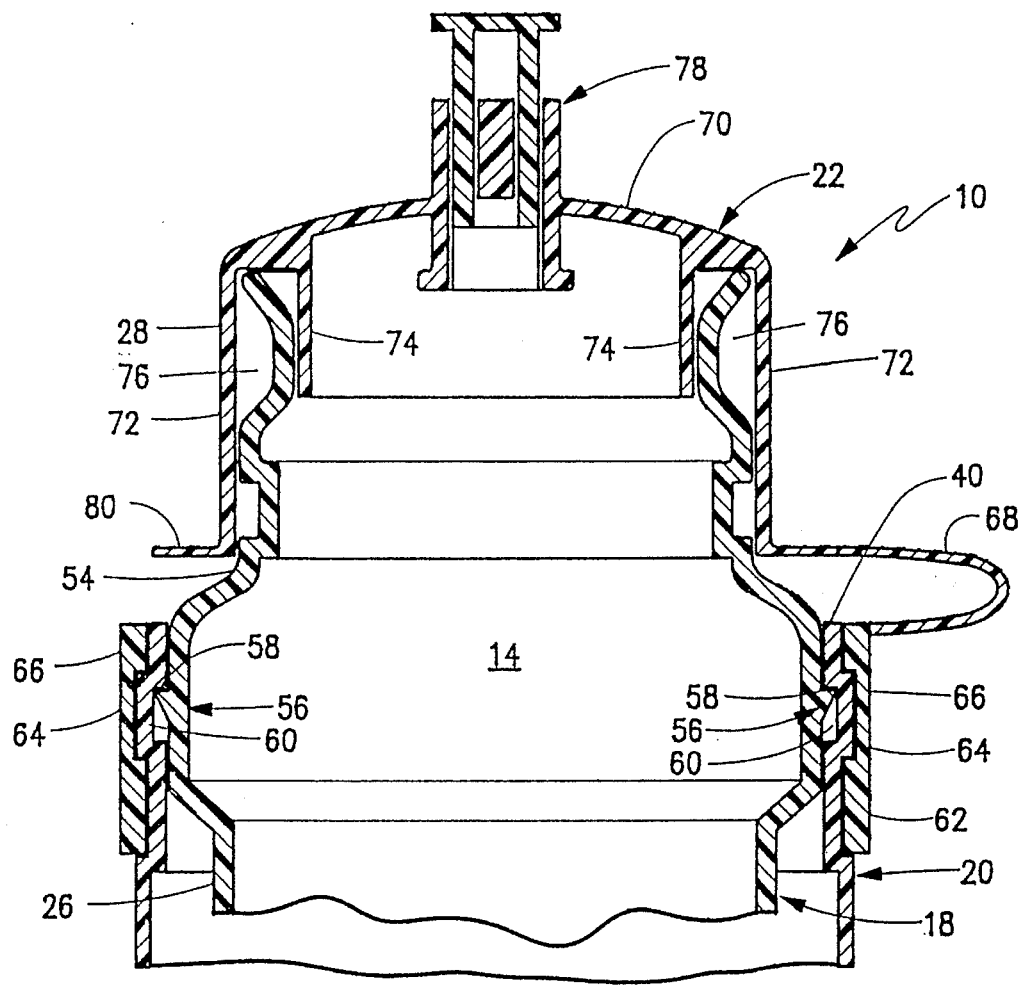
FIG. 4 is a partial side view in cross-section taken along lines 4—4 of FIG. 1 of the insulated container of the present invention with the cap structure in the cap-on condition.
Figures 5, 6, 7:
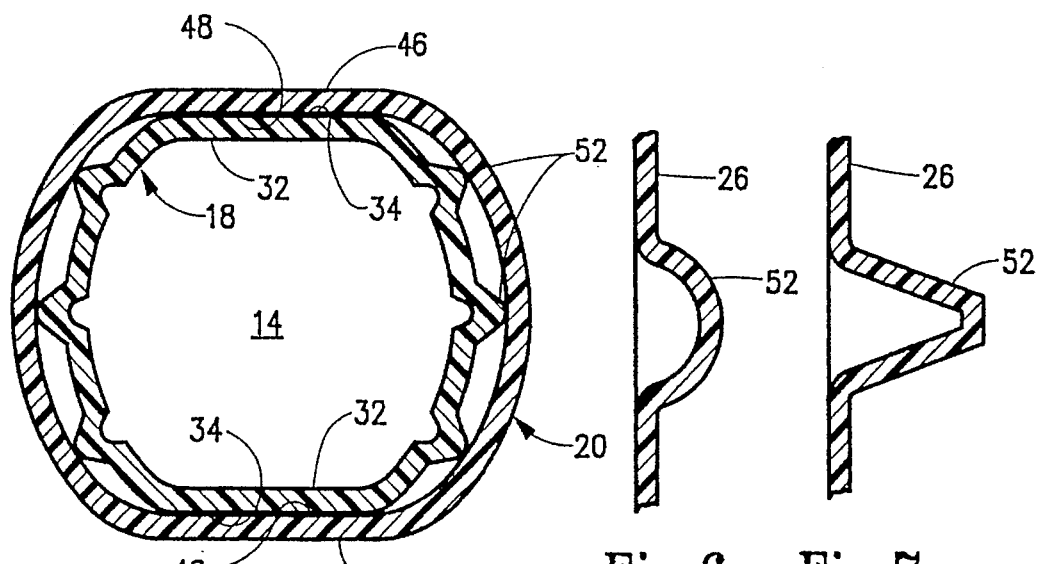
FIG. 5 is a cross-sectional view of the insulated container of the present invention taken along lines 5—5 of FIG. 3.
FIG. 6 is an enlarged cross-sectional view of a protrusion projecting from a surrounding first sidewall of an inner container body of the insulated container of the present invention.
FIG. 7 is a cross-sectional view of an alternative configuration of a protrusion projecting from the surrounding first sidewall of the inner container body.

A first exemplary embodiment of an insulated container 10 of the present invention is generally introduced in FIGS. 1–10. Insulated container 10 is adapted to store a liquid 12 and is operative to inhibit heat transfer between liquid 12 stored in an interior 14 of insulated container 10 and an exterior ambient environment 16. Insulated container 10 includes an inner container body 18, an outer shell 20 and a cap structure 22. Inner container body 18 is formed of a stiff yet resilient first material such as plastic. As best shown in FIGS. 2 and 3, inner container body 18 includes a first bottom wall 24 connected to a surrounding first sidewall 26 extending longitudinally along longitudinal axis "L" and terminating in a first top rim 28. First top rim 28 defines a first opening 30 into interior 14 of insulated container 10. As best shown in FIGS. 2, 3 and 7, first sidewall 26 has a pair of opposed elongated first concavities 32 oriented transversely to longitudinal axis "L" of inner container body 18. First concavities 32 form a pair of exteriorly opening channels 34 disposed opposite one another on first sidewall 26 of inner container body 18.

Outer shell 20 is fabricated of a stiff yet resilient second material such as plastic. Outer shell 20 includes a second bottom wall 36 connected to a surrounding second sidewall 38 which extends longitudinally and terminates in a second top rim 40. Second top rim 40 defines a second opening 42, as best shown in FIGS. 8–10, into a shell interior 44 which is sized and adapted to receive inner container body 18 in a close-fitted yet spaced-apart telescopic engagement to define a mated state as shown in FIGS. 1–3. Second sidewall 38 has a pair of opposed elongated second concavities 46 which are oriented transversely to longitudinal axis "L" when in the mated state to form a pair of opposed interiorly projecting rims 48. Ribs 48 are sized and positioned to respectively engage channels 34 on inner container body 18 when in the mated state. With reference to FIG. 5, surface to surface contact is made where ribs 48 engage channels 34.

As best shown in FIGS. 1–4, cap structure 22 is removably connected to inner container body 18. In FIGS. 1 and 4, cap structure 22 is operative in a cap-on condition to cover and retain liquid 12 in interior 14 of insulated container 10. In FIGS. 2 and 3, cap structure 22 is operative in a cap-off condition to permit liquid 12 to be transferred into and be dispensed from interior 14 of insulated container 10.

Inner container body 18 includes a pair of opposed flat walls 50 as shown in FIGS. 1 and 3. Flat walls 50 are connected to first sidewall 26 and first bottom wall 24 of inner container body 18 to form a tapered bottom portion thereof. As best shown sequentially in FIGS. 8, 9 and 10, inner container body 18 and outer shell 20 are moved into the mated state. When inner container body 18 and outer shell 20 are moved into the mated state, flat walls 50 are operative to attack ribs 48 to cause ribs 48 to separate so that inner container body 18 can be telescopically received into outer shell 20. In FIG. 8, the pair of flat walls 50 attack the pair of ribs 48. In FIG. 8, the pair of flat walls 50 separate ribs 48 so that inner container body 18 can be telescopically received into outer shell 20. In FIG. 10, inner container body 18 is substantially telescopically received into outer shell 20.

Inner container body 18 also includes a plurality of protrusions 52 which extend longitudinally along and circumferentially about first sidewall 26. Protrusion 52 are operative to maintain a spaced-apart relationship between first sidewall 26 and second sidewall 38 when inner container body 18 and outer shell 20 are in the mated state. Although not by way of limitation, each protrusion 52 can be configured as a dome as shown in FIG. 6 or as a frustum as shown in FIG. 7. In either case, minimal surface contact is made between outer shell 20 when contacted as shown, for example, in FIG. 5. Also, inner container body 18 includes a neck 54 which extends between first top rim 28 of inner container body 18 and second top rim 40 of outer shell 20 when inner container body 18 and outer shell 20 are in the mated state. Neck 54 is operative to releasably receive cap structure 22 which is described in greater detail hereinbelow.

With reference to FIG. 4, insulated container 10 includes an interlocking structure 56. Interlocking structure 56 has a ledge 58 connected to inner container body 18 and a groove 60 formed into outer shell 20. Groove 60 is sized and adapted to receive ledge 58 in releasable matable engagement so that inner container body 18 and outer shell 20 are interlocked when in the mated state. Ledge 58 extends circumferentially about and radially outwardly from first sidewall 26 of inner container body 18 between first top rim 28 and the pair of first concavities 32. Groove 60 is formed circumferentially into outer shell 20 between the pair of second concavities 46 and second top rim 40 and groove 60 faces into shell interior 44. One of ordinary skill in the art would appreciate an alternative interlocking structure whereby the ledge would be connected to the outer shell and the groove would be formed into the inner container body. Thus, ledge 58 can be connected to either inner container body 18 or outer shell 22 while groove 60 can be formed into an other one of outer shell 20 or inner container body 18. Further, although inner container body 18 and outer shell 20 interlocked in the mated state, minimal surface to surface contact is required.

In FIGS. 1–4, a retainer band 62 is sized and adapted to extend circumferentially about outer shell 20 between the pair of second concavities 46 and second top rim 40. Retainer band 62 is operative to be removably force-fitted into outer shell 20. Retainer band 62 includes a retainer channel 64 which extends circumferentially thereabout and faces radially inwardly. Outer shell 20 includes a ridge 66 which extends radially outwardly and circumferentially thereabout. Ridge 66 is disposed between the pair of second concavities 46 and the second top rim 40. Retainer channel 64 is sized and adapted to receive ridge 66 so that retainer band 62 and outer shell 20 can be releasably and matably engaged to each other.

A retainer structure 68 is connected to and between retainer band 62 and cap structure 22. Retainer structure 68 is operative to retain cap structure 22 in connection with insulated container 10 when cap structure 22 is in the cap-off condition. Therefore, one of ordinary skill in the art would appreciate a variety of retainer structures that would be capable of retaining cap structure 22 to insulated container 10 when cap structure 22 is in the cap-off condition. It is preferred, however, that retainer structure 68 is a plastic strap which is formed as a unitary construction with retainer band 62 and cap structure 22.

Cap structure 22 includes a top wall 70, an annular outer wall 72 and an annular inner wall 74. Annular outer wall 72 and annular inner wall 74 depend downwardly from top wall 70 in a concentric relationship to form a continuous annular channel 76 which is sized and adapted to receive first top rim 28 and an upper portion of neck 54 when cap structure 22 is in the cap-on condition. First top rim 28 and the upper portion of neck 54 are operative with cap structure 22 to provide a seal so that liquid 12 is prevent from leaking therebetween. Cap structure 22 also includes a valve assembly 78 which is commonly used for water bottles. Valve assembly 78 is operative in an opened position (FIGS. 2–4) and a closed position (FIG. 1) when cap structure 22 is in the cap-on condition. In the opened position, valve assembly 78 permits liquid 12 contained in interior 14 of insulated container 10 to be dispensed therefrom. In the closed position, valve assembly 78 prevents liquid 12 contained in interior 14 of insulated container 10 from being dispensed. Cap structure 22 also includes a lip 80 which projects from annular outer wall 72 to facilitate removing cap structure 22 from the upper neck portion, i.e. when capt structure 22 is in the cap-on condition.

Figures 11, 12:
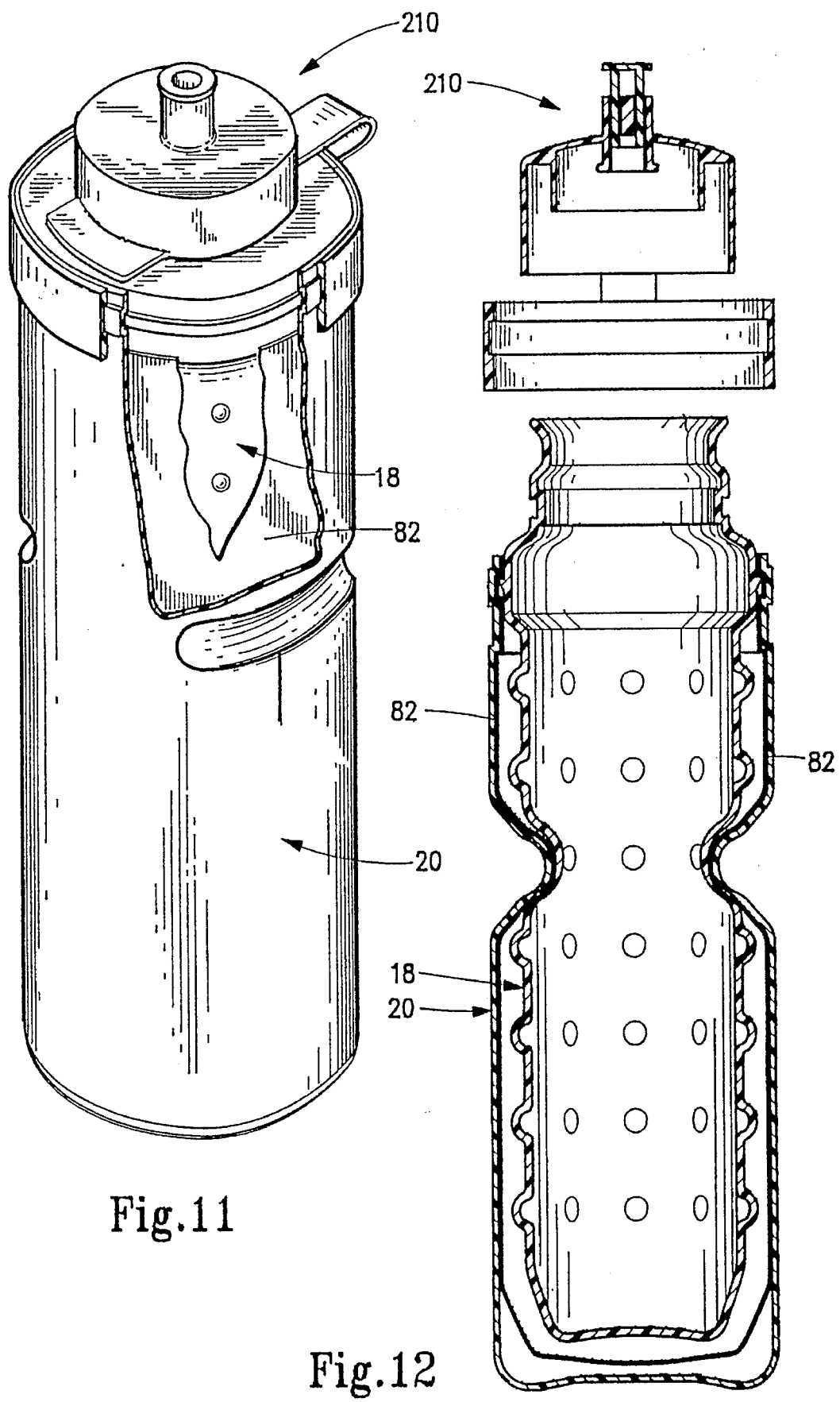
FIG. 11 is a perspective view of a second exemplary embodiment of an insulated container of the present invention with a cap structure in a cap-on condition and with an insulating element disposed between the outer shell and the inner container body.
FIG. 12 is a side view in cross-section of the second exemplary embodiment of the insulated container of the present invention in FIG. 11 with a cap structure in a cap-off condition and showing the insulating element disposed between the inner container body and the outer shell.

A second exemplary embodiment of an insulated container 210 is introduced in FIGS. 11 and 12. Insulated container 210 is structurally identical to the first exemplary embodiment of the present invention described hereinabove. However, insulated container 210 includes an insulating element 82. Insulating element 82 is fabricated of flexible insulating material and is sized and adapted to be disposed between inner container body 18 and outer shell 20 when inner container body 18 and outer shell 20 are in the mated state. It is preferred that insulating element 82 is fabricated from a metallic foil material and it is further preferred that insulating element 82 is formed as a pouch which is adapted to slidably receive inner container body 18 so that, when inner container body 18 and outer shell 20 are in the mated state, insulating element 82 is disposed therebetween. A skilled artisan would appreciate that other types of insulating material, such as blown fiberglass material, can be disposed within the void space to enhance the insulating capabilities of the present invention.

One of ordinary skill in the art would appreciate the insulation capabilities of the present invention. Particularly, the insulated container of the present invention minimizes surface to surface contact between the inner container body and the outer shell thereby minimizing heat transfer by thermal conductivity. Also, the close-fitted yet spaced-apart relationship between the inner container body and the outer shell defines void space which minimizes heat transfer by thermal conductivity and connection. Furthermore, the skilled artisan would appreciate that the insulated container is simple to manufacture and easy to assembly. Ease of assembly is particularly facilitated by the tapered end portion of the inner container body which attacks the pair of interior ribs of the outer shell. Additionally, the tapered bottom portion of the inner container body makes it less likely that an insulating element enveloping the inner container body will be torn when the inner container body is moved into the mated state with the outer shell.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. An insulated container adapted to store a liquid and operative to inhibit heat transfer between the liquid in an interior thereof and an exterior ambient environment, comprising:

(a) an inner container body formed of a stiff yet resilient first material, said inner container body including a first bottom wall connected to a surrounding first sidewall extending longitudinally and terminating in a first top rim defining a first opening into the interior of the insulated container, said first sidewall having a pair of opposed elongated first concavities oriented transversely to a longitudinal axis of said inner container body thereby to form a pair of exteriorly opening channels disposed opposite one another on said first sidewall of said inner container body;

(b) an outer shell fabricated of a stiff yet resilient second material, said outer shell including a second bottom wall connected to a surrounding second sidewall extending longitudinally and terminating in a second top rim defining a second opening into a shell interior sized and adapted to receive said inner container body in a close-fitted yet spaced-apart telescopic engagement to define a mated state, said second sidewall having a pair of opposed elongated second concavities oriented transversely of the longitudinal axis when in the mated state thereby forming a pair of opposed interiorly projecting ribs sized and positioned to respectively engage the channels on said inner container body when in the mated state; and (c) a cap structure removably connected to said inner container body and operative in a cap-on condition to cover and retain the liquid in the interior of the insulated container and in a cap-off condition to permit the liquid to be transferred into and be dispensed from the interior of the insulated container.

2. An insulated container according to claim 1 wherein said inner container body includes a pair of opposed flat walls connected to said first sidewall and said first bottom wall to form a tapered bottom portion whereby when said inner container body and said outer shell are moved into the mated state, said flat walls attack said ribs thereby causing said ribs to separate so that said inner container body can be telescopically received into said outer shell.

3. An insulated container according to claim 1 wherein said inner container body includes a plurality of protrusions extending longitudinally along and circumferentially about said inner cylindrical wall and operative to maintain a spaced-apart relationship between said first sidewall and second sidewall when said inner container body and said outer shell is in the mated state.

4. An insulated container according to claim 1 including an interlocking structure having a ledge connected to one of said inner container body and said outer shell and a groove formed into an other one of said inner container body and said outer shell, said groove sized and adapted to receive said ledge in releasable, matable engagement so that said inner container body and said outer shell are interlocked in the mated state.

5. An insulated container according to claim 4 wherein said ledge extends circumferentially about and radially outwardly from said first sidewall of said inner container body between said first top rim and said pair of first concavities and wherein said groove is formed circumferentially into said outer shell between said pair of second concavities and said second top rim and facing into said shell interior.

6. An insulated container according to claim 1 including a retainer band sized and adapted to extend circumferentially about said outer shell between and said pair of second concavities and said second top rim, said retainer band operative to be removably force-fitted onto said outer shell.

7. An insulated container according to claim 6 wherein said retainer band includes a channel extending circumferentially thereabout and facing radially inwardly and wherein said outer shell includes a ridge extending radially outwardly and circumferentially thereabout, said ridge disposed between and said pair of second concavities and said second top rim, said channel sized and adapted to receive said ridge so that said retainer band and said outer shell can be releasably and matably engaged to each other.

8. An insulated container according to claim 1 wherein said cap structure includes a valve assembly operative in an opened position and in a closed position when said cap structure is in said cap-on condition whereby, in said opened position, said valve assembly permits the liquid contained in the interior of the insulated container to be dispensed therefrom and, in said closed condition, said valve element prevents the liquid contained in the interior of the insulated container from being dispensed.

9. An insulated container according to claim 1 including an insulating element fabricated from a flexible insulating material and sized and adapted to be disposed between said inner container body and outer shell when said inner container body and cuter shell are in the mated state.

10. An insulated container according to claim 9 wherein said insulating element is fabricated from a metallic foil material and formed as a pouch adapted to slidably receive said inner container body so that, when said inner container and said outer shell are in the mated state, said insulating element is disposed therebetween.

11. An insulated container according to claim 1 wherein said inner container body includes a neck extending between said first top rim of said inner container body and said second top rim of said outer shell when said inner container body and said outer shell are in the mated state, said neck operative to releasably receive said cap structure.

12. An insulated container according to claim 1 wherein said first stiff yet resilient material and said second stiff yet resilient material are plastic.

13. An insulated container adapted to store a liquid and operative to inhibit heat transfer between the liquid in an interior thereof and an exterior ambient environment, comprising:

(a) an inner container body formed of a plastic material, said inner container body including a first bottom wall connected to a surrounding first sidewall extending longitudinally and terminating in a first top rim defining a first opening into the interior of the insulated container, said first sidewall having a pair of opposed elongated first concavities oriented transversely to a longitudinal axis of said inner container body thereby to form a pair of exteriorly opening channels disposed opposite one another on said first sidewall of said inner container body;

(b) an outer shell fabricated of a plastic material, said outer shell including a second bottom wall connected to a surrounding second sidewall extending longitudinally and terminating in a second top rim defining a second opening into a shell interior sized and adapted to receive said inner container body in a close-fitted yet spaced-apart telescopic engagement to define a mated state, said second sidewall having a pair of opposed elongated second concavities oriented transversely of the longitudinal axis when in the mated state thereby forming a pair of opposed interiorly projecting ribs sized and positioned to respectively engage the channels on said inner container body when in the mated state; and (c) a cap structure removably connected to said inner container body and operative in a cap-on condition to cover and retain the liquid in the interior of the insulated container and in a cap-off condition to permit the liquid to be transferred into and be dispensed from the interior of the insulated container.

14. An insulated container according to claim 13 wherein said inner container body includes a pair of opposed flat walls connected to said first sidewall and said first bottom wall to form a tapered bottom portion whereby when said inner container body and said outer shell are moved into the mated state, said flat walls attack said ribs thereby causing said ribs to separate so that said inner container body can be telescopically received into said outer shell.

15. An insulated container according to claim 13 wherein said inner container body includes a plurality of protrusions extending longitudinally along and circumferentially about said inner cylindrical wall and operative to maintain a spaced-apart relationship between said first sidewall and second sidewall, when said inner container body and said outer shell is in the mated state.

16. An insulated container according to claim 13 wherein said inner container body includes a neck extending between said first top rim of said inner container body and said second top rim of said outer shell when said inner container body and said outer shell are in the mated state, said neck operative to releasably receive said cap structure.

17. An insulated container according to claim 16 including an interlocking structure having a ledge connected to one of said inner container body and said outer shell and a groove formed into an other one of said inner container body and said outer shell, said groove sized and adapted to receive said ledge in releasable, matable engagement so that said inner container body and said outer shell are interlocked in the mated state.

18. An insulated container according to claim 17 wherein said ledge extends circumferentially about and radially outwardly from said first sidewall of said inner container body between said first top rim and said pair of first concavities and wherein said groove is formed circumferentially into said outer shell between said pair of second concavities and said second top rim and facing into said shell interior.

19. An insulated container according to claim 13 including a retainer band sized and adapted to extend circumferentially about said outer shell between and said pair of second concavities and said second top rim, said retainer band operative to be removably force-fitted onto said outer shell.

20. An insulated container according to claim 19 wherein said retainer band includes a channel extending circumferentially thereabout and facing radially inwardly and wherein said outer shell includes a ridge extending radially outwardly and circumferentially thereabout, said ridge disposed between and said pair of second concavities and said second top rim, said channel sized and adapted to receive said ridge so that said retainer band and said outer shell can be releasably and matably engaged to each other.

21. An insulated container according to claim 19 including a retainer structure connected to and between said retainer band and said cap structure.

22. An insulated container according to claim 21 wherein said retainer structure is a plastic strap formed as a unitary construction with said retainer band and said cap structure.

23. An insulated container according to claim 21 wherein said cap structure includes a valve assembly operative in an opened position and in a closed position when said cap structure is in said cap-on condition whereby, in said opened position, said valve assembly permits the liquid contained in the interior of the insulated container to be dispensed therefrom and, in said closed condition, said valve element prevents the liquid contained in the interior of the insulated container from being dispensed.

24. An insulated container according to claim 13 including an insulating element fabricated from a flexible insulating material and sized and adapted to be disposed between said inner container body and outer shell when said inner container body and outer shell are in the mated state.

25. An insulated container according to claim 24 wherein said insulating element is fabricated from a metallic foil material and formed as a pouch adapted to slidably receive said inner container body so that, when said inner container and said outer shell are in the mated state, said insulating element is disposed therebetween.

\* \* \* \* \*